United States Patent
Zhao et al.

(10) Patent No.: US 9,722,912 B2
(45) Date of Patent: Aug. 1, 2017

(54) NETWORK STOCHASTIC CROSS-LAYER OPTIMIZATION FOR MEETING TRAFFIC FLOW AVAILABILITY TARGET AT MINIMUM COST

(71) Applicant: Google Inc., Mountain View, CA (US)

(72) Inventors: Xiaoxue Zhao, Fremont, CA (US);
Emilie Jeanne Anne Danna, Sunnyvale, CA (US); Christoph Albrecht, San Jose, CA (US); Bikash Koley, Cupertino, CA (US); Satyajeet Singh Ahuja, Cupertino, CA (US); Vinayak Dangui, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 93 days.

(21) Appl. No.: 14/922,905

(22) Filed: Oct. 26, 2015

(65) Prior Publication Data

US 2017/0012856 A1    Jan. 12, 2017

Related U.S. Application Data

(60) Provisional application No. 62/190,553, filed on Jul. 9, 2015.

(51) Int. Cl.
*H04L 12/721* (2013.01)
*G06F 17/50* (2006.01)
(Continued)

(52) U.S. Cl.
CPC ............ *H04L 45/12* (2013.01); *G06F 17/509* (2013.01); *H04L 41/14* (2013.01); *H04L 41/145* (2013.01);
(Continued)

(58) Field of Classification Search
CPC ....... H04L 45/12; H04L 41/14; G06F 17/509; H04W 16/18
See application file for complete search history.

(56) References Cited

U.S. PATENT DOCUMENTS

| | | | |
|---|---|---|---|
| 2003/0187967 A1 | 10/2003 | Walsh et al. | |
| 2005/0063299 A1* | 3/2005 | Atkinson | H04J 14/0227 370/216 |

(Continued)

OTHER PUBLICATIONS

Bigos, Wojtek, et al. Survivable MPLS Over Optical Transport Networks: Cost and Resource Usage Analysis. IEEE Journal on Selected Areas in Communications, Institute of Electrical and Electronics Engineers (IEEE), vol. 25, No. 5, pp. 949-962, 2007. <10.1109/JSAC.2007.070608>. <hal-00180750>.

(Continued)

*Primary Examiner* — Khaled Kassim
*Assistant Examiner* — Syed S Ali
(74) *Attorney, Agent, or Firm* — McDermott Will & Emery LLP

(57) ABSTRACT

The present disclosure describes system and methods for network planning. The systems and methods can incorporate network traffic demands, availability requirements, latency, physical infrastructure and networking device capability, and detailed cost structures to calculate a network design with minimum or reduced cost compared to conventional methods. In some implementations, the method include providing an initial, deterministic set of failures, and then successively performing a network optimization and a network availability simulation to determine which failures most impact the performance of the network model. The high impact failures can then be provided back into the system, which generates an improved network design while still maintaining minimum cost.

14 Claims, 3 Drawing Sheets

(51) Int. Cl.
*H04L 12/24* (2006.01)
*H04W 16/18* (2009.01)

(52) U.S. Cl.
CPC ......... *H04W 16/18* (2013.01); *G06F 2217/10* (2013.01); *G06F 2217/72* (2013.01)

(56) References Cited

U.S. PATENT DOCUMENTS

| | | | | |
|---|---|---|---|---|
| 2006/0167784 | A1* | 7/2006 | Hoffberg | G06Q 20/401 705/37 |
| 2006/0268871 | A1* | 11/2006 | Van Zijst | H04L 47/125 370/390 |
| 2007/0087756 | A1* | 4/2007 | Hoffberg | G06Q 10/0631 455/450 |
| 2008/0205271 | A1* | 8/2008 | Aissaoui | H04L 12/66 370/235 |
| 2012/0064886 | A1* | 3/2012 | Kim | H04W 24/04 455/423 |
| 2012/0083263 | A1* | 4/2012 | Kim | H04W 72/085 455/423 |
| 2012/0309431 | A1* | 12/2012 | Bodog | H04W 16/18 455/456.6 |
| 2013/0190009 | A1* | 7/2013 | Johansson | H04W 64/003 455/456.1 |
| 2013/0244670 | A1* | 9/2013 | Biermann | H04B 7/024 455/446 |
| 2014/0078888 | A1 | 3/2014 | Jenkins et al. | |
| 2015/0078286 | A1* | 3/2015 | Kim | H04L 1/18 370/329 |
| 2015/0365271 | A1* | 12/2015 | Chunduri | H04L 45/741 370/216 |
| 2017/0054638 | A1* | 2/2017 | Ee | H04L 45/741 |

OTHER PUBLICATIONS

Cisco, White Paper. Multilayer Optimization with Cisco WAN Automation Software Portfolio: Reduce Costs and Improve Resiliency, Mar. 2015 (9 pages).

De Maesschalck, Sophie, et al. "Multi-layer traffic grooming in networks with an IP/MPLS layer on top of a meshed optical layer." Global Telecommunications Conference, 2003. Globecom'03. IEEE. vol. 5. IEEE, 2003.

Gouveia, Luis, et al. "MPLS over WDM network design with packet level QoS constraints based on ILP models." INFOCOM 2003. Twenty-Second Annual Joint Conference of the IEEE Computer and Communications. IEEE Societies. vol. 1. IEEE, 2003.

Singh, Kavinesh, Andy Philpott, and Kevin Wood. Column generation for design of survivable networks. Working paper, Dept. of Engineering Science, University of Auckland, Auckland, New Zealand, 2005.

Invitation to Pay Additional Fees and, Where Applicable, Protest Fee mailed Oct. 28, 2016 in PCT Application No. PCT/US2016/040806.

International Search Report and Written Opinion mailed Dec. 21, 2016 in PCT Application No. PCT/US2016/040806.

* cited by examiner

NETWORK STOCHASTIC CROSS-LAYER OPTIMIZATION FOR MEETING TRAFFIC FLOW AVAILABILITY TARGET AT MINIMUM COST

CROSS-REFERENCE TO RELATED APPLICATIONS

This application claims priority to U.S. Provisional Patent Application No. 62/190,553 filed on Jul. 9, 2015 and titled "NETWORK STOCHASTIC CROSS-LAYER OPTIMIZATION FOR MEETING TRAFFIC FLOW AVAILABILITY TARGET AT MINIMUM COST," which is herein incorporated by reference in its entirety.

BACKGROUND

Large-scale networks are designed to meet many different service objectives. Networks designs are separately optimized for each of the service objectives. Typically, the optimization is done manually based on a user's past experience and judgment, and often results in overly provisioned networks. The over provisioning of networks represents a significant cost to the network owner as the network scales.

SUMMARY OF THE DISCLOSURE

According to one aspect of the disclosure a method for designing a network includes generating a minimum monetary cost network model capable of satisfying a traffic demand. The minimum monetary cost network is generated responsive to a set of variables each defining one of a network cost, a physical layer feature, or a logical layer feature, a set of constraints defining a relationship between at least two variables from the set of variables, and an objective to reduce the monetary cost of a network defined by the minimum monetary cost network model. The method also includes generating an optimization set of network failures ($F_o$). The method also includes iteratively, and until the current minimum monetary cost network satisfies the traffic demands given a random set of failures ($F_R$), updating the minimum monetary cost network model capable of satisfying the traffic demand given $F_o$. The minimum monetary cost network is updated responsive to the set of variables, the set of constraints, and the objective to reduce the monetary cost of the network. The method also includes generating a random set of failures $F_R$. The method also includes determining whether the minimum cost monetary network model satisfies the traffic demand given $F_R$. In response to determining that the minimum cost network does not satisfy the traffic demands given $F_R$, the method includes selecting a subset of failures from $F_R$ and adding the subset of failures from $F_R$ to $F_O$. The method also includes, in response to determining that the minimum cost network satisfies the traffic demands given $F_R$, outputting the current minimum cost network model.

According to another aspect of the disclosure a system for designing a network includes computer readable medium storing processor executable instructions and a least one processor. Execution of the processor executable instructions causes the at least one processor to generate a minimum monetary cost network model capable of satisfying a traffic demand. The minimum monetary cost network is generated responsive to a set of variables that each define one of a network cost, a physical layer feature, or a logical layer feature, a set of constraints defining a relationship between at least two variables from the set of variables, and an objective to reduce the monetary cost of a network defined by the minimum monetary cost network model. Execution of the processor executable instructions cause the at least one processor to generate an optimization set of network failures $F_o$. Execution of the processor executable instructions causes the at least one processor to, iteratively and until the current minimum monetary cost network satisfies the traffic demands given a random set of failures $F_R$, update the minimum monetary cost network model. The minimum monetary cost network model is capable of satisfying the traffic demand given $F_o$ and is updated responsive to the set of variables, the set of constraints, and the objective to reduce the monetary cost of the network. Execution of the processor executable instructions causes the at least one processor to generate a random set of failures $F_R$ and determine whether the minimum cost monetary network model satisfies the traffic demand given $F_R$. In response to determining that the minimum cost network does not satisfy the traffic demands given $F_R$, execution of the processor executable instructions causes the at least one processor to select a subset of failures from $F_R$ and add the subset of failures from $F_R$ to $F_o$. In response to determining that the minimum cost network satisfies the traffic demands given $F_R$, execution of the processor executable instructions causes the at least one processor to output the current minimum cost network model.

According to another aspect of the disclosure a computer readable medium includes instructions for designing a network. Execution of the instructions cause a processor to generate a minimum monetary cost network model capable of satisfying a traffic demand. The minimum monetary cost network is generated responsive to a set of variables that each define one of a network cost, a physical layer feature, or a logical layer feature, a set of constraints defining a relationship between at least two variables from the set of variables, and an objective to reduce the monetary cost of a network defined by the minimum monetary cost network model. Execution of the processor executable instructions the processor to generate an optimization set of network failures $F_o$. Execution of the processor executable instructions causes the processor to, iteratively and until the current minimum monetary cost network satisfies the traffic demands given a random set of failures $F_R$, update the minimum monetary cost network model. The minimum monetary cost network model is capable of satisfying the traffic demand given $F_o$ and is updated responsive to the set of variables, the set of constraints, and the objective to reduce the monetary cost of the network. Execution of the processor executable instructions causes the processor to generate a random set of failures $F_R$ and determine whether the minimum cost monetary network model satisfies the traffic demand given $F_R$. In response to determining that the minimum cost network does not satisfy the traffic demands given $F_R$, execution of the processor executable instructions causes the processor to select a subset of failures from $F_R$ and add the subset of failures from $F_R$ to $F_o$. In response to determining that the minimum cost network satisfies the traffic demands given $F_R$, execution of the processor executable instructions causes the processor to output the current minimum cost network model.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description of the invention.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

The present disclosure describes system and methods for network planning. The systems and methods can incorporate network traffic demands, availability requirements, latency, physical infrastructure and networking device capability, and detailed cost structures to calculate a network design with minimum or reduced cost compared to conventional methods. In some implementations, the method includes providing an initial, deterministic set of failures, and then successively performing a network optimization and a network availability simulation to determine which failures most impact the performance of the network model. The high impact failures can then be provided back into the system, which generates an improved network model while reducing the cost of the network.

Figure 1A:
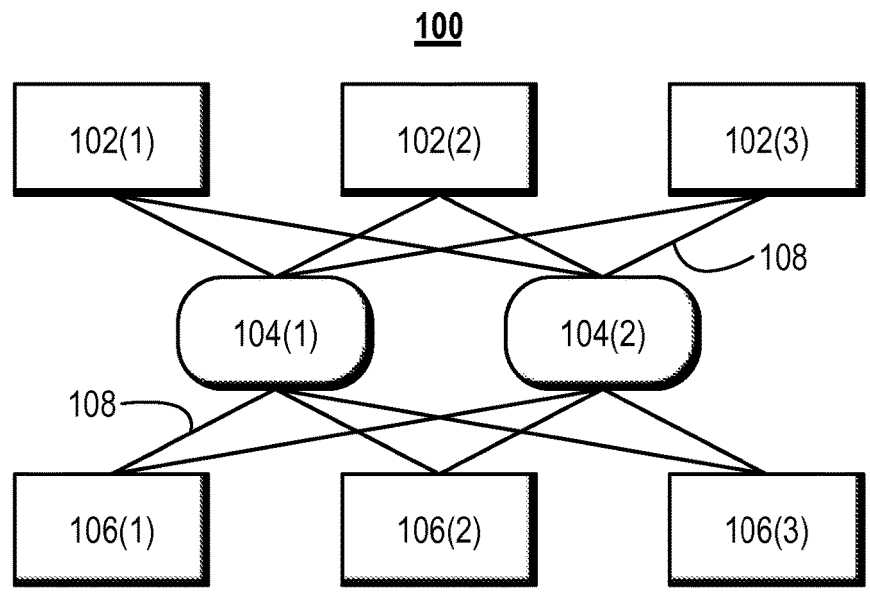
FIG. 1A illustrates block diagram of an example physical topology of a network.

FIG. 1A illustrates block diagram of an example physical topology of an example network 100. The network 100 includes upper level nodes 102(1)-102(3) (generally referred to as upper level nodes 102) and lower level nodes 106(1)-106(3) (generally referred to as lower level nodes 106). The upper level nodes 102 are coupled to the lower level nodes 106 through switches 104(1) and 104(2) (generally referred to as switches 104). The upper level nodes 102 and the lower level nodes 106 are coupled to the switches 104 through physical links 108.

In some implementations, the switches 104 are wavelength selective switches or other types of switches, such as, optical circuit switches (OCSs). Each switch 104 includes a plurality of north ports to which the upper level nodes 102 are coupled and a plurality of south ports to which the lower level nodes 106 are coupled. The interconnection of the north ports and the south ports within the switch 104 are configurable and the interconnection of the north ports and the south ports determine how the upper and lower level nodes are interconnected. In some implementations, a physical topology is referred to as a L1 topology, which refers to the first level in the open systems interconnection (OSI) stack.

Figure 1B:
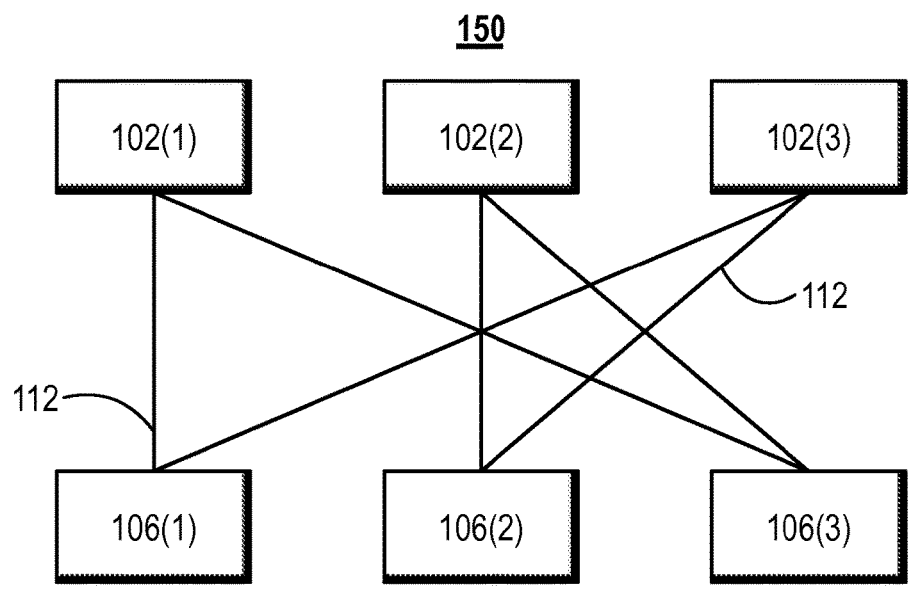
FIG. 1B illustrates a block diagram of an example logical topology implemented on the physical topology of network illustrated in FIG. 1A.

FIG. 1B illustrates a block diagram of an example logical topology 150 implemented on the physical topology of network 100. The logical topology 150 defines how the upper level nodes 102 communicate across the network 100 created by the switches 104 to the lower level nodes 106. For example, one of the switches 104 couples upper level node 102(1) to lower level node 106(1), and the other switch 104 couples upper level node 102(1) to lower level node 106(3). Logical links 112 form the connection between the upper level nodes 102 and lower level nodes 106 within the logical topology 150. The mapping between the physical topology of the network 100 and the logical topology 150 can be referred to as a cross-layer network topology. In some implementations, a logical topology is referred to as a L3 topology, which refers to the third level in the open systems interconnection (OSI) stack.

Figure 2:
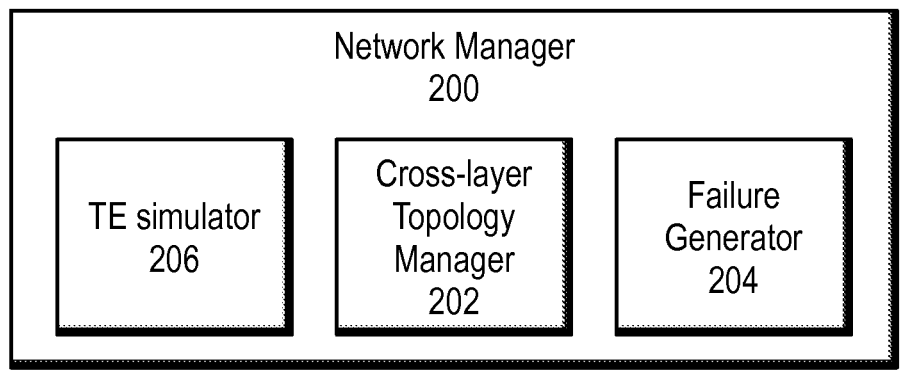
FIG. 2 illustrates a block diagram of an example network manager.

FIG. 2 illustrates a block diagram of an example network manager 200. The network manager 200 includes a cross-layer topology manager 202 that is configured to generate cross-layer mappings between a physical topology of a network and the logical topology of the network. The network manager 200 also includes a failure generator 204 that is configured to generate random failures for each of the links in the physical topology. The network manager 200 includes a traffic engineering (TE) simulator 206 that receives the data generated by, or received by, the cross-layer topology manager 202 and the failure generator and calculates whether the network defined by the L1 and L3 topology models is capable of fulfilling traffic demands.

The network manager 200 is implemented by special purpose logic circuitry (e.g., a FPGA (field programmable gate array) or an ASIC (application specific integrated circuit)) and/or a general purpose computing device. The network manager 200 can also include, in addition to hardware, code stored on a computer readable medium that, when executed, causes the network manager 200 to perform one or more of the methods described herein.

The failure generator 204 of the network manager 200 generates combinations of possible failures that can occur in the network. Each of the possible failures can be referred to as a failure sample, and includes the failure of one or more links and other network devices in the physical network. In some implementations, the failure generator 204 accepts past failure data, such as the probability that a link or network device will fail at a specified time. In some implementations, the possible failures generated by the failure generator 204 are the failures most likely to occur in the network based on the past failure data. In other implementations, the failure generator 204 can receive user instructions for the generation of possible failures. For example, a user may wish to run "what-if analysis" to determine the consequences if a specific failure occurs. In these cases, the user can indicate to the failure generator 204 which links and network devices should fail and how they should fail.

The TE simulator 206 of the network manager 200 is a traffic engineering simulator that receives data from the cross-layer topology manager 202, failure generator 204, and other sources to calculate which demands across the logical topology model are satisfied and which are not met.

As an overview, the cross-layer topology manager 202 of the network manager 200 is configured to generate physical topology models, logical topology models, and cross-layer topologies, which are mappings between the logical and physical layers of a network. In some implementations, generating physical topology models, logical topology models, and cross-layer topologies is referred to as "computing a network." The cross-layer topology manager 202 is configured to compute networks that reduce the overall cost of the network, but enable the network to satisfy availability, latency, and bandwidth demands. In some implementations, the cross-layer topology manager 202 includes a mixed-integer-linear problem solver to compute a reduced cost network that satisfies a plurality of constraints. In some implementations, linear problems are computationally less complex than mixed-integer-linear problems, and the cross-layer topology manager 202 approximates the results of a mixed-integer-linear problem by solving for a linear problem and rounding up the results to the nearest integer. For example, the use of a linear problem may result in a network design with fractional hardware components. As an example, the cross-layer topology manager 202 may design a network that includes 129.4 racks. The cross-layer topology manager 202 would then round up the results so they could be physically implemented—for example, the 129.4 racks would be implemented as 130 racks.

In computing a network, the cross-layer topology manager 202 receives topology data, capacity data, latency data, equipment data, availability data, or a combination thereof as constraints. For example, when developing a network model that reduces overall cost, the cross-layer topology manager 202 receives information about the physical structures of the network. The information about the physical layer can include whether the fibers are owned or leased from other providers. The leased and owned fibers are considered separately when generating a reduced cost cross-layer topology because owned fibers include additional costs compared to leased fibers, such as the cost of installing and maintaining the fibers. The cost of maintaining the fibers can also include the cost of additional equipment needed to operate the fibers such as racks, chassis, optical commons, line cards, inline amplifiers, and can also include electricity costs. The cross-layer topology manager 202 also receives a set of failures from the failure generator 204 before computing a network model. In some implementations, the failures are generated according to an existing failure policy for the network. In other implementations, the failures are generated through a network simulation that takes into account failure probabilities.

The cross-layer topology manager 202 generates a linear programming model based on a list of variables and constraints provided to the cross-layer topology manager 202. The cross-layer topology manager 202 solves the linear programming model, given the list of variables and constraints, with the objective of reducing or minimizing the monetary cost of the network. The set of variables include variables that define a network cost, a physical layer feature, or a logical layer feature. An example network cost variable can include the cost of purchasing a rack or the cost of transmitting data over a leased fiber. An example physical layer feature variable can include the number of ports that a physical router has, and an example logical layer variable can include the capacity of a logical link. The list of variables the cross-layer topology manager 202 of the network manager 200 can implement into the integer linear programming model include: a Boolean variable for each owned fiber indicating whether the owned fiber is active; a Boolean variable for each L1 node indicating whether the L1 node is from a predetermined manufacture; a non-negative integer variable associated with each respective manufacturer indicating the number of chassis at each L1 node provided by the respective manufacturer; a non-negative integer variable for each L1 node indicating the number of racks at the L1 node for a predetermined manufacture; a Boolean variable for each L1 node indicating whether the L1 node includes optical commons for a predetermined manufacture; a non-negative integer variable for each L1 node indicating the number of line cards for add/drop at the L1 node for a predetermined manufacture; a Boolean variable for each L1 node indicating if a sublink has regeneration at the L1 node for the predetermined manufacture; a non-negative integer variable for each L1 node indicating half the number of line cards for regeneration at the L1 node for a predetermined manufacture; a non-negative integer variable for each sublink indicating a number of leased fibers used by the sublink; a non-negative integer variable for each sublink indicating a number of ports the sublink occupies on a L3 node; a Boolean variable for each link indicating if the sublink is used; a non-negative continuous variable indicating the capacity of a link; a non-negative continuous variable for each sublink indicating the capacity of a sublink; a non-negative continuous variable indicating the amount of traffic; and any combination thereof.

The constraints define a relationship between at least two of the above described variables. The list of constraints the cross-layer topology manager 202 of the network manager 200 can implement into the integer linear programming model include: if a sublink is used the corresponding link is considered to also be used; if a node is not a reconfigurable optical add/drop multiplexer (ROADM) and has used links then the node is an intermediate line amplifier (ILA); if a node is a ROADM then all its links have optical commons; if a node has a degree greater than three then the node is a ROADM; if a link needs add/drop at a L1 node then the number of line cards with add/drop is greater than or equal to the capacity of the link divided by the bandwidth of a single line card; a link is considered to be used if the link includes a positive number of leased fibers or line cards; add, drop, and regeneration occur at a multiplexer or demultiplexer (e.g., a ROADM); regeneration is required when the fiber link exceeds the fiber reach; if the sublink is regenerated at a L1 node then the number of line cards required to realize the capacity of the sublink is greater than or equal to the capacity of the sublink divided by the bandwidth capacity of each of the line cards; each of the line cards and optical commons are required to be in a chassis and each chassis holds a predetermined number of line cards or optical commons; at least one rack is required per degree of each of the optical commons; each of the chassis is required to be in a rack and each of the racks holds a predetermined number of chassis; each router must have more (or at least have the same number of) ports as physical the links connected thereto; each node in the physical layer must have (or at least have the same number of) ports as the physical links connected thereto; the capacity of each link is bounded by the sum of the capacities of the link's sublinks; the number of leased fibers have a capacity that is equal to or greater than the sum of the capacities of the sublinks traversing the leased fibers; for each failure, the traffic through a link is less than the capacity of the link; for each failure, each flow, and each node, the incoming traffic to a node is equal to the outgoing traffic of the node, except for the source and the sink of the flow, where the difference of incoming and outgoing flow is equal to the (negative) demand; or any combination thereof.

Using the above constraints and variables, the cross-layer topology manager 202 can compute a network model that reduces the cost of implementing the network by solving the linear program that minimizes the cost as provided by an equation that adds together the total cost of operating each fiber in operation, the total cost of each ILA L1 node, the total cost of each number of racks needed, the total cost of the optical commons, the total cost of the line cards needed for add/drop, two times the total cost of the line cards needed for regeneration, the total cost data transmission through the leased fibers, and the cost of the routers used to provide a port to each of the physical links.

Programmatically, the above described objective provided to the cross-layer topology manager 202 could be entered as:

sum{fiber} FiberLightingCost(fiber)*islitvar(fiber)
+sum{l1node, vendor} ILACost*isilavar(l1node, vendor)
+sum{l1node, vendor} ChassisCost(vendor)*numchassisvar(l1node, vendor)
+sum{l1node, vendor} RackCost(vendor)*numracksvar(l1node, vendor)
+sum{fiber,l1node, vendor} OpticalCommonsCost(vendor)*hasopticalcommonsvar_(fiber, l1node, vendor)
+sum{link,l1node, vendor} LineCardForAddDropCost(vendor)*numlinecardsadddropvar_(link, l1node, vendor)
+sum{sublink, l1node, vendor} 2*LineCardForRegenCost(vendor)*numlinecardsregenonesidevar(sublink, l1node, vendor)
+sum{sublink, leasedwave} LeasedWaveCost(leasedwave)*numleasedwavesvar(sublink, leasedwave)
+sum{sublink,l3node} PortCost(l3node)*numportsvar(sublink, l3node)

In some implementations, to improve the scalability of the methods described herein, the cross-layer topology manager 202 can approximate the above described variables and constraints or include additional constraints and bounds to the above described variables. For example, when generating the L1 paths, the cross-layer topology manager 202 can reduce the number of paths considered by using a shortest paths algorithm that includes iteratively removing the edges of the computed paths, and then recalculating the paths with the edges removed. In other implementations, the number of paths considered is reduced by not considering paths with a latency above a predetermined threshold.

In some implementations to improve scalability, the cross-layer topology manager 202 assumes each sublink of a link has the same path. Because the sublinks are assumed to have the same path, a failure affecting the link causes a total failure of each of the sublinks. In other implementations, a link's sublinks have different paths, which enables the link to operate at a reduced capacity when failure occurs in one of the physical links supporting a portion of the link's sublinks. In these implementations, the cross-layer topology manager 202 also includes a constraint that the latency between the sublinks that follow different paths is below a predetermined threshold.

In some implementations, the number of links is constrained. A pair of nodes can be linked through multiple links, and each of the multiple links may be realized by multiple, different sublinks. In the physical environment, the number of links that can couple two nodes together can be limited because of maintenance, configuration, or spacing considerations. To account for these physical considerations, in some implementations, the number of parallel links between a pair of nodes is bounded by a constraint.

In some implementations, a geographical constraint is added. The geographical constraint reduces the number of possible fiber paths through the network by limiting the links included in the calculation to a portion of the network. In a subsequent calculation by the cross-layer topology manager 202 the remaining portion of the network is analyzed.

In some implementations, each failure, flow, link, and direction of the network is associated with a variable. To reduce the number of variables, in some implementations, the parallel physical links between a pair of nodes are grouped together as a single "megalink."

In some implementations, additional constraints are placed on physical links running parallel between a node pair. For example, a constraint may be set that for a primary and secondary path the latency of the secondary path is larger than the latency of the primary path. An additional constraint for parallel link can include a constraint that there is no path in the network that has a latency larger than the latency of the primary path and smaller than the secondary path. The constraint is added, in some implementations, that traffic flowing through the network is only routed along a limited number of paths and that the traffic is split evenly along the limited number of paths.

In some implementations, flows are latency sensitive, and latency based constraints are incorporated into the linear program solved by the cross-layer topology manager 202. For example, the latency based constraints can bound the average latency of flows through the network. In some implementations, the number of variables is reduced by removing paths that include large detours (which cause large latencies). In some implementations, a flow is routed along one of a predetermined number of paths. In these implementations, the possible paths that are not one of the predetermined number of paths are discarded to reduce the number of variables in the linear program.

In some implementations, the cross-layer topology manager 202 reduces the computational complexity of the calculated linear program by removing failures from the calculation that are dominated by other failures. For example, if a first failure impacts only a portion of the links impacted by a second failure and the second failure results in the loss of a greater amount of network capacity, then the first failure is dominated by the second failure. In these implementations, the first failure is not included in the network optimization calculations performed by the cross-layer topology manager 202.

In some implementations, the computational efficiency of the cross-layer topology manager 202 is increased by decomposing single-source-multi-destination flows into single-source-single-destination flows. After decomposing the flows, the decomposed flows with the same destination are then combined. If the network has N nodes, and there is a flow from every node to every other node (full mesh), the decomposition process decreases the total number of variables by (N−1). The flows can be decomposed by starting at a destination node that has a negative outflow, and traversing backwards along the path from the destination to the single source. The minimum flow along the backwards path is selected. The single-source-multi-destination flow along the path is reduced by the selected minimum flow, which results in at least one link no longer carrying a flow. The process is repeated until each of the single-source-multi-destination flows are fully decomposed.

In some implementations, the computational efficiency of the cross-layer topology manager 202 is increased by incorporating small, long flows into a sequence of larger, shorter flows. For example, consider a network that includes one short, large flow (e.g., 100 flow units) from node A to node B, one short, large flow from node B to node C, and a long, small flow (e.g., 1 flow unit) from node A to node C. The computational complexity is reduced by modeling the three flows as two flows that include a first flow from node A to node B having 101 flow units and a second flow from node B to node C having 101 flow units.

Figure 3:
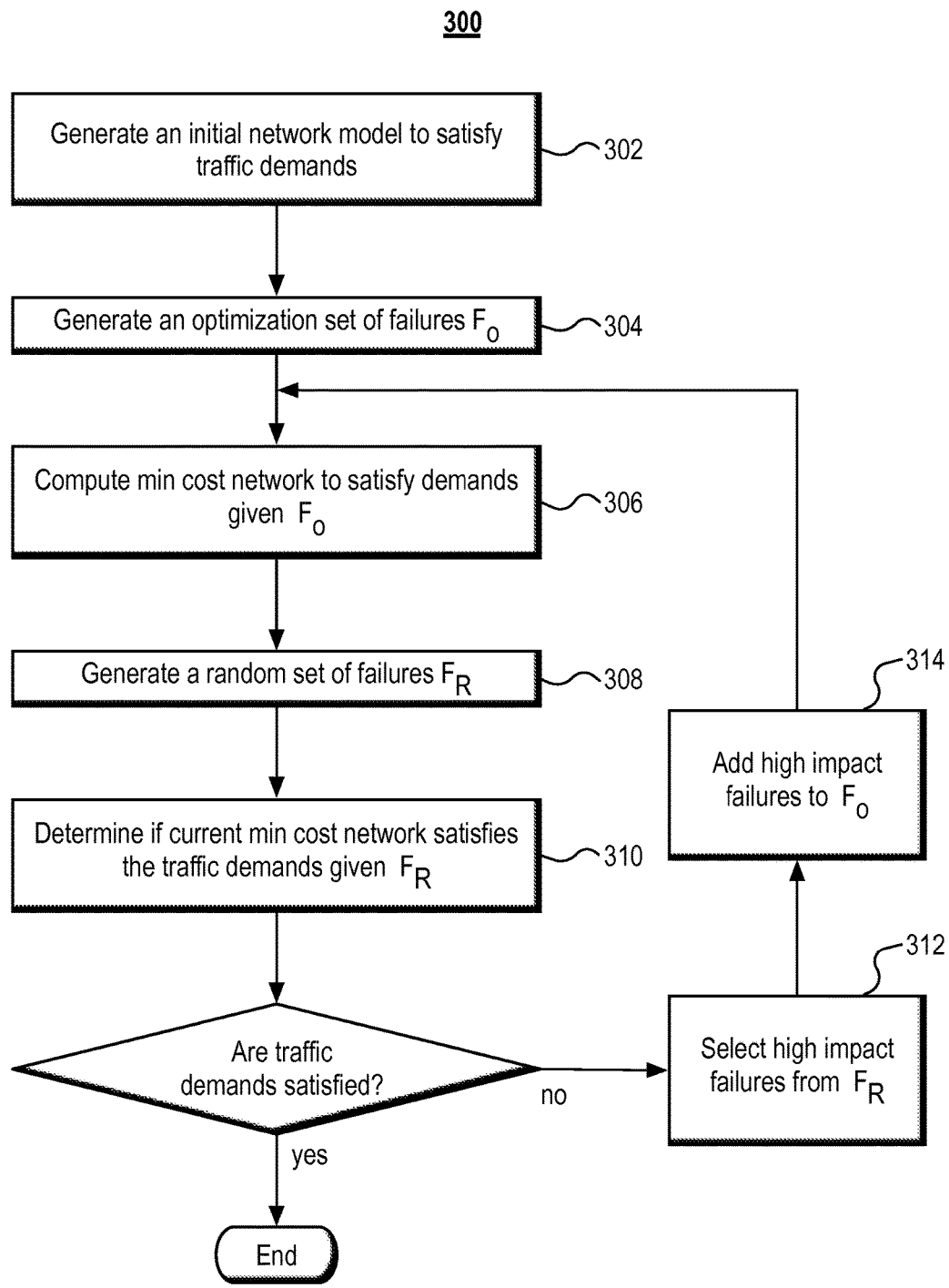
FIG. 3 illustrates a flowchart of an example method for designing a network using the example network manager illustrated in FIG. 2.

FIG. 3 illustrates a flowchart of an example method 300 for designing a network. The method 300 includes generating an initial network model capable of satisfying a given set of traffic demands (step 302). The method 300 includes generating an optimization set of failures ($F_o$) (step 304). A minimum monetary cost network is computed that satisfies the given $F_o$ (step 306). A random set of failures ($F_R$) are generated (step 308). The method 300 includes determining if the minimum monetary cost network satisfies the traffic demands given $F_R$ (step 310). If the minimum monetary cost network is not able to satisfy the traffic demands given $F_R$, the method 300 selects the high impact failures from $F_R$ (step 312). The high impact failures are added to $F_o$ (step 314), and then the method repeats steps 306-310 until the minimum monetary cost network satisfies the traffic demands given a new random set of failures generated for each iteration of steps 306-310.

As set forth above, the method 300 includes generating an initial network model to satisfy a given set of traffic demands (step 302). In some implementations, generating the initial network model includes generating a model of a physical topology, a logical topology, and the cross-layer topology that maps the logical topology to the physical topology. The network model is generated to satisfy the traffic demands when the network is not experiencing any type of failure.

The method includes generating an optimization set of failures ($F_o$) (step 304). In some implementations, the optimization set of failures ($F_o$) indicate a random selection of failures in the physical network, such as one or more physical links failing, that are used to design a network model.

Next, and also referring to FIG. 2, a new minimum monetary cost network is computed (step 306). The minimum monetary cost network is computed by providing the optimization set of failures ($F_o$) to the cross-layer topology manager 202. The cross-layer topology manager 202 also receives the set of traffic demands. As described above in relation to FIG. 2, the cross-layer topology manager 202 receives or generates values for a plurality of variables and constraints used to describe the network and components thereof. Responsive to the set of failures, the cross-layer topology manager 202 computes a network model able to satisfy the provided traffic demands while the network model experiences each of the failures in the optimization set of failures. The computed network model is computed to reduce or minimize the monetary cost of implementing the network. The computed network model is referred to as a minimum monetary cost network model. The minimum monetary cost network is computed by a linear program solver to solve for a minimum monetary cost given the plurality of variable values and constraints. In some implementations, the minimum monetary cost network is not actually the absolutely minimum cost network that might be identified given infinite time and computing resources. Instead, the minimum monetary cost network can be the least cost network identified given the amount of computing resources, the particular computing algorithms, and the amount of time allocated to identifying the optimal computer network given the above-discussed demands, variables, and constraints.

The method 300 also includes generating a set of random failures ($F_R$) (step 308). In some implementations, the additional failures include a random selection of possible physical network failures. In other implementations, the network manager 200 receives probabilistic failure data or past failure data and generates the additional failures responsive to the received failure data. For example, independent probability functions may be used to generate possible failures based on the received failure probability data.

Next, the method 300 includes determining if the minimum monetary cost network satisfies the traffic demands when the minimum cost network experiences each of the failures in the random failure set ($F_R$) (step 310).

If the flows do not meet the required availability, then the method 300 includes selecting the failures from the random failure set ($F_R$) with the highest impact on flow availability (step 312). In some implementations, an "impact" metric for each of the random failures is calculated by multiplying the probability of the respective failure by the number of flows that are unavailable due to the failure. In other implementations, other functions may be used to calculate the impact metric. For example, the impact metric may take into account partial reductions in flow availability instead of considering availability to be a binary analysis. In some implementations, a failure impact threshold is provided and the failures with an impact metric higher than the threshold are selected. In some implementations, all the additional failures are selected. In some implementations, additional parameters, such a traffic demands, are provided back to the cross-layer topology manager 202 for updating the minimum cost network model. For example, traffic demands that the model is unable to satisfy may be provided back to the cross-layer topology manager 202 for use in updating the minimum cost network model.

The method 300 also includes adding the selected failures from the random failure set ($F_R$) to the optimization failure set ($F_o$) (step 314). In some implementations, the added failures become constraints to enforce that the flows that were made unavailable by the additional failures are available in the new minimum monetary cost network model calculated by the cross-layer topology manager 202. The method 300 then repeats steps 306-310 until the minimum monetary cost network generated responsive to the updated $F_O$ satisfies the traffic demands when the network experiences the $F_R$, where a new $F_R$ is generated through each iteration of the steps 306-310. In some implementations, the method includes testing a minimum cost network against multiple randomly generated failure sets $F_{RO}$-$F_{RN}$ during each iteration, selecting the high impact failures from each set. In some implementations, the method requires the minimum cost network to satisfy traffic demands in response to multiple randomly generated failure sets before ending the iteration. For example, in some implementations, if the current minimum cost network fails to satisfy the first randomly generated failure set, the current iteration ends immediately, and the iterative process will not stop until the minimum cost network satisfies, for example, three randomly generated failure sets.

In some implementations, as described above, the sets of failures are selected outside the computation of a minimum cost network. For example, the method 300 is initially provided a fixed set of failures that is updated after each time the simulation discovers a failure the network model cannot support.

In other implementations, the set of failures are selected during the computation of the minimum cost network—providing a closed loop approach to computing the minimum monetary cost network model. In these implementations, the cross-layer topology manager 202 is initially provided a set of failures for computing a minimum cost network model, the occurrence probability of each of the failures in the set of failures, and a target availability for each of a plurality of flows. Each of the failures of the set of failures is randomly generated, for example, treating the occurrence of each failure as an independent random variable. The cross-layer topology manager 202 then generates the minimum monetary cost network model such that the probability of each of the plurality of flows being satisfied across all the failures in the failure set is greater than the respective target availability for each of the plurality of flows. For example, if a flow has a target availability of 95%, the network model is generated such that the flow is available during failures whose probability sum up to at least 95%. Note that the cross-layer topology need not modify the network to ensure availability of all flows in all failure sets, only a sufficient number of failure sets to meet the predetermined target availabilities of each flow. Next, the computation of the minimum cost network is modeled as a two-stage stochastic integer program, where the first stage decisions are the long-term capacity planning decisions (e.g., the capacity for links, L3/L1 mapping, fiber lighting, hardware placement) and the second stage decisions are the real-time decisions of flow routing during each failure scenario. A chance constraint is then used to enforce that the flow demand is satisfied in a subset of failures of the failures set where the probability of the flow being satisfied over the subset of failures is greater than or equal to the target availability.

In some implementations, when link and node failures occur it can take minutes to generate new end-to-end paths. However, locally repairing a portion of the path can be done by rerouting the portion of the path over backup tunnels that bypass the failed links or nodes. Locally repairing the portion of the path can occur much faster than compared to generating a new end-to-end path (e.g., on the sub-50 millisecond time frame).

When a link or node failure occurs, a node adjacent to the failure can start forwarding traffic over the backup path with an expectation that the backup path has the bandwidth needed to support the new traffic. In some implementations, the backup path is a local backup path, which is the shortest path (or substantially shortest path) that bypasses the failure. The local backup path provides relatively much faster repair (e.g., on the sub-50 millisecond time frame) than generating a new end-to-end path.

In some implementations, the backup paths are incorporated into the minimum cost network model. The amount of additional bandwidth added to the minimum cost network to support the backup paths is referred to as a reroute tax. Incorporating the backup paths into the minimum cost network model begins with generating the minimum cost network as described above with respect to method 300. In some implementations, for every possible network failure in the minimum cost network, a backup path is identified. In some other implementations, backup paths are identified for only a subset of possible network failures. If the backup path would be unable to support its normal traffic and the rerouted traffic, the amount of additional bandwidth needed along the backup path is calculated and the additional bandwidth is added to the backup path in the minimum cost network model. Summing the calculated additional bandwidth needed for each failure provides the reroute tax for the network. In some implementations, backup paths are only generated for paths carrying high priority traffic—for example, traffic that has a high availability requirement.

In some implementations, the above described method 300 can provide multiple minimum cost networks. For example, the method 300 can be run multiple times, during each of which different random failure sets can be provided in step 308, which can cause different minimum cost network models to be generated by the method 300. In these implementations, a final minimum cost network can be selected from the plurality of minimum cost networks generated by the multiple runs by determining which of the minimum cost networks has the lowest cost when the reroute tax is incorporated into the total cost of the network. For example, a first minimum cost network may have a cost of X that is slightly less than the cost Y of a second minimum cost network; however, the reroute tax $T_1$ for the first minimum cost network may be significantly more than the reroute tax $T_2$ for the second minimum cost network. In this example, the second minimum cost network may be selected for implementation because the total cost $(Y+T_2)$ of the second minimum cost network is less than the total cost $(X+T_1)$ of the first minimum cost network.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A method for designing a network, the method comprising:
    generating a minimum monetary cost network model capable of satisfying a traffic demand and responsive to a set of variables each defining one of a network cost, a physical layer feature, or a logical layer feature, a set of constraints defining a relationship between at least two variables from the set of variables, and an objective to reduce the monetary cost of a network defined by the minimum monetary cost network model;
    generating an optimization set of network failures $F_o$;
    iteratively, until the current minimum monetary cost network satisfies the traffic demands given a random set of failures $F_R$:
        updating the minimum monetary cost network model capable of satisfying the traffic demand given $F_o$ and generated responsive to the set of variables, the set of constraints, and the objective to reduce the monetary cost of the network;
        generating an initial random set of failures;
        determining an impact metric for each randomly generated failure in the initial random set of failures;
        forming the set of failures $F_R$ from the initial random set of failures by selecting failures in the initial random set of failures having an impact metric above a predetermined threshold;
        determining whether the minimum cost monetary network model satisfies the traffic demand given $F_R$;
        in response to determining that the minimum cost network does not satisfy the traffic demands given $F_R$, selecting a subset of failures from $F_R$ and adding the subset of failures from $F_R$ to $F_o$; and
        in response to determining that the minimum cost network satisfies the traffic demands given $F_R$, outputting the current minimum cost network model,
    wherein, the minimum monetary cost network model is generated and updated using a linear program.

2. The method of claim 1, further comprising generating and updating the minimum monetary cost network model with a mixed-integer-linear program.

3. The method of claim 1, wherein $F_R$ is generated by identifying failures based on independent random variables associated with each of a plurality of potential failures.

4. The method of claim 1, further comprising updating the minimum monetary cost network model to satisfy an additional set of traffic demands given $F_o$.

5. The method of claim 1, further comprising:
    identifying a local backup path for each of traffic demands given a set of network failures $F_l$; and
    updating the minimum monetary cost network model capable of satisfying the traffic demands when the traffic demands traverse their respective local backup path.

6. A system comprising a computer readable medium storing processor executable instructions and a least one processor, wherein execution of the processor executable instructions cause the at least one processor to:
    generate a minimum monetary cost network model capable of satisfying a traffic demand and responsive to a set of variables each defining one of a network cost, a physical layer feature, or a logical layer feature, a set of constraints defining a relationship between at least two variables from the set of variables, and an objective to reduce the monetary cost of a network defined by the minimum monetary cost network model;

generate an optimization set of network failures $F_o$;

iteratively, until the current minimum monetary cost network satisfies the traffic demands given a random set of failures $F_R$:

update the minimum monetary cost network model capable of satisfying the traffic demand given $F_o$ and generated responsive to the set of variables, the set of constraints, and the objective to reduce the monetary cost of the network;

generate an initial random set of failures;

determine an impact metric for each randomly generated failure in the initial random set of failures;

form the set of failures $F_R$ from the initial random set of failures by selecting failures in the initial random set of failures having an impact metric above a predetermined threshold;

determine whether the minimum cost monetary network model satisfies the traffic demand given $F_R$;

in response to determining that the minimum cost network does not satisfy the traffic demands given $F_R$, select a subset of failures from $F_R$ and add the subset of failures from $F_R$ to $F_O$; and in response to determining that the minimum cost network satisfies the traffic demands given $F_R$, output the current minimum cost network model, wherein, the minimum monetary cost network model is generated and updated using a linear program.

7. The system of claim 6, wherein execution of the processor executable instructions further causes the at least one processor to generate and update the minimum monetary cost network model with a mixed-integer-linear program.

8. The system of claim 6, wherein $F_R$ is generated with a Monte Carlo simulation.

9. The system of claim 6, wherein execution of the processor executable instructions further causes the at least one processor to update the minimum monetary cost network model to satisfy an additional set of traffic demands given $F_o$.

10. The system of claim 9, wherein execution of the processor executable instructions further causes the at least one processor to:

identify a backup path for each of traffic demands given a set of network failures $F_t$; and update the minimum monetary cost network model capable of satisfying the traffic demands when the traffic demands traverse their respective backup path.

11. A computer readable medium storing processor executable instructions thereon, wherein execution of the processor executable instructions cause a processor to:

generate a minimum monetary cost network model capable of satisfying a traffic demand and responsive to a set of variables each defining one of a network cost, a physical layer feature, or a logical layer feature, a set of constraints defining a relationship between at least two variables from the set of variables, and an objective to reduce the monetary cost of a network defined by the minimum monetary cost network model;

generate an optimization set of network failures $F_o$;

iteratively, until the current minimum monetary cost network satisfies the traffic demands given a random set of failures $F_R$:

update the minimum monetary cost network model capable of satisfying the traffic demand given $F_o$ and generated responsive to the set of variables, the set of constraints, and the objective to reduce the monetary cost of the network;

generate an initial random set of failures;

determine an impact metric for each randomly generated failure in the initial random set of failures;

form the set of failures $F_R$ from the initial random set of failures by selecting failures in the initial random set of failures having an impact metric above a predetermined threshold;

determine whether the minimum cost monetary network model satisfies the traffic demand given $F_R$;

in response to determining that the minimum cost network does not satisfy the traffic demands given $F_R$, select a subset of failures from $F_R$ and add the subset of failures from $F_R$ to $F_O$; and in response to determining that the minimum cost network satisfies the traffic demands given $F_R$, output the current minimum cost network model, wherein, the minimum monetary cost network model is generated and updated using a linear program.

12. The computer readable medium of claim 11, wherein execution of processor executable instructions further causes the processor to generate and update the minimum monetary cost network model with a mixed-integer-linear program.

13. The computer readable medium of claim 11, wherein $F_R$ is generated with a Monte Carlo simulation.

14. The computer readable medium of claim 11, wherein execution of processor executable instructions further causes the processor to update the minimum monetary cost network model to satisfy an additional set of traffic demands given $F_o$.

* * * * *